No. 897,770. PATENTED SEPT. 1, 1908.
H. OLDENDORPH.
NUT LOCK.
APPLICATION FILED OCT. 6, 1906.
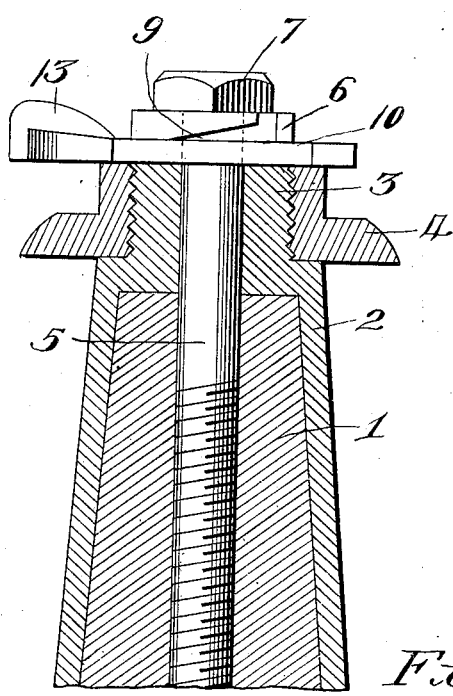
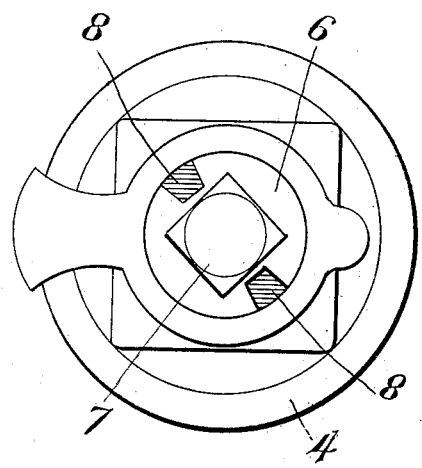
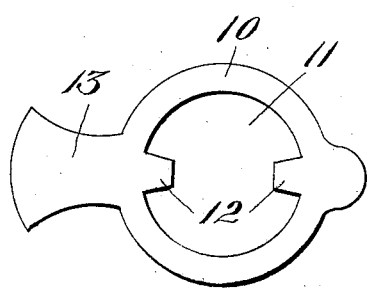
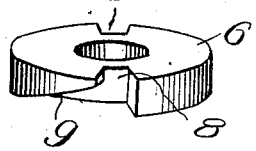
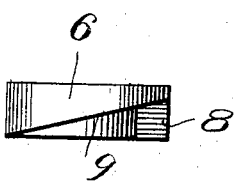
Witnesses
J. T. L. Wright
Annie L. Brown
Inventor
Henry Oldendorph.
By Victor J. Evans
Attorney

UNITED STATES PATENT OFFICE.

HENRY OLDENDORPH, OF ST. LOUIS, MISSOURI.

NUT-LOCK.

No. 897,770.   Specification of Letters Patent.   Patented Sept. 1, 1908.

Application filed October 6, 1906. Serial No. 337,750.

*To all whom it may concern:*

Be it known that I, HENRY OLDENDORPH, a citizen of the United States, residing at St. Louis, in the county of St. Louis City and State of Missouri, have invented new and useful Improvements in Nut-Locks, of which the following is a specification.

This invention relates to nut locks designed especially for use in connection with the wheel holding nuts on vehicle axles, and has for its objects to provide a comparatively simple, inexpensive device of this character whereby the axle nut may be readily and securely locked against movement, and one which permits of the nut being conveniently removed when circumstances require.

With these and other objects in view, the invention comprises the novel features of construction and combination of parts more fully hereinafter described.

In the accompanying drawings: Figure 1 is a view taken centrally and longitudinally through a portion of an axle spindle equipped with a nut lock embodying the invention.
Fig. 2 is an end view of the device. Fig. 3 is a plan view of the locking member. Fig. 4 is an elevation of the retaining member. Fig. 5 is a perspective view of the retaining member.

Referring to the drawings, 1 designates an axle spindle having applied thereto a metal sleeve or skein terminating at its outer end in a reduced, threaded neck 3 adapted to receive the axle nut 4, these parts, which are conventionally shown herein, being of the usual or any appropriate construction and material and adapted in practice to perform their ordinary functions.

Fixed to the outer end of the spindle 1 by means of a lag screw 5 entered centrally and longitudinally into the latter is an annular retaining member or collar 6 which bears at its outer face against the screw head 7 and is provided with a pair of oppositely disposed, transverse openings 8 leading respectively to reversely inclined cam walls 9 formed at the inner face of the member 6, there being removably seated over the retaining member 6 a locking member or head 10 having a central opening 11 into which projects a pair of oppositely disposed bearing lugs 12 formed for entrance through the openings 8 and to ride beneath the inclined walls 9, while formed on the head 11 is a radially projecting weighted arm 13 through the medium of which the member may be turned and held in locking position.

The walls 9 coöperate with the outer face of the part 3 so as to form pockets which taper in a direction away from the recesses 8, and the lugs 12 of the locking member bear directly on the walls 9 at one side and directly on the outer face of the part 3 at the opposite side of the locking member. The locking member is provided with a projection at a point diametrically opposite from the arm 13 and should the locking member stick so that it could not be loosened by hand, a wrench can be applied to the locking member by spanning the latter and bringing the jaws respectively into engagement with the arm 13 and the said projection, thus permitting the wrench to turn the locking member without slipping.

In practice, the retaining member 6, which is of a diameter slightly less than that of the neck 3, is attached to the spindle by means of the screw 5 and after application of the nut 4 for holding the wheel in place the locking member 10 is applied over the retaining member 6 and partially turned through the medium of the handle 13 for causing the lugs 12 to ride beneath the inclined faces 9 and press the member 10 against the end of the spindle, thus to securely retain the nut 4 in place thereon. When the member 10 is in locking position, the weighted arm 13 will hang downward, thus serving through gravity to hold the locking member against accidental movement. It is to be observed that when the locking member 10 is removed the nut 4 may, owing to the collar 6 being of a diameter slightly less than that of the neck 3, be readily removed to permit removal of the wheel.

Having thus described my invention, what I claim is:

The combination of a member externally threaded at one end and provided with a bore, a nut screwed on the said threaded end, a headed bolt extending through the bore, a collar assembled on the bolt and held in contact with the end of the member by the head of the bolt and provided with slots extending from one side to the other and having peripheral recesses opening into the slots and presenting cam walls disposed opposite to the end surface of the member and coöperating with the latter to form pockets tapering in a direction away from the slots, and an annular locking piece proportioned to be freely assembled over the collar and having lugs adapted to enter the slots and normally disposed in the said pockets and bearing at one side directly on the end face of the member and at the opposite side directly on the said cam walls, said locking piece being in contact with the nut at all points.

In testimony whereof, I affix my signature in presence of two witnesses.

HENRY OLDENDORPH.

Witnesses:
HARRY HOENER,
W. F. GILSTERE.